US009479364B2

(12) United States Patent
He et al.

(10) Patent No.: US 9,479,364 B2
(45) Date of Patent: *Oct. 25, 2016

(54) UNEQUALIZED CLOCK DATA RECOVERY FOR SERIAL I/O RECEIVER

(71) Applicant: Intel Corporation, Santa Clara, CA (US)

(72) Inventors: Yun He, Santa Clara, CA (US); Sanjib Sarkar, Folsom, CA (US); Fei Deng, Folsom, CA (US); Senthil Arun Singaravelu, Folsom, CA (US); Narender Nagulapally, Folsom, OR (US); Pranali Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,259

(22) Filed: May 13, 2015

(65) Prior Publication Data
US 2015/0249556 A1    Sep. 3, 2015

Related U.S. Application Data

(62) Division of application No. 13/976,189, filed as application No. PCT/US2012/034281 on Apr. 19, 2012, now Pat. No. 9,048,999.

(51) Int. Cl.
*H04L 25/03* (2006.01)
*H04L 7/00* (2006.01)
*G06F 13/40* (2006.01)
(Continued)

(52) U.S. Cl.
CPC ..... *H04L 25/03057* (2013.01); *G06F 13/4072* (2013.01); *H04L 7/0062* (2013.01); *H04L 7/0079* (2013.01); *H04L 7/0276* (2013.01); *H04L 7/0332* (2013.01); *H04L 25/03949* (2013.01); *H04L 7/0087* (2013.01)

(58) Field of Classification Search
USPC ................. 375/355, 220, 356, 376
See application file for complete search history.

(56) References Cited

U.S. PATENT DOCUMENTS 6,002,717 A    12/1999  Gaudet
7,577,193 B2    8/2009  Goth
(Continued)

FOREIGN PATENT DOCUMENTS

CN    203434996 U    2/2014
TW    201411352 A    3/2014
(Continued)

OTHER PUBLICATIONS

"U.S. Appl. No. 13/976,189, Non Final Office Action mailed Aug. 25, 2014", 13 pgs.
(Continued)

*Primary Examiner* — Kabir A Timory
(74) *Attorney, Agent, or Firm* — Schwegman Lundberg & Woessner, P.A.

(57) ABSTRACT

A serial input/output method and receiver include an receiver portion to receive an analog differential serial input and sample the input to provide data and error signals, an equalization feedback loop responsive to the data and error signals to adjust the receiver portion, a phase feedback mechanism separate from the equalization feedback loop to provide a phase error, and a clock data recovery block coupled to receive the phase error to perform timing recovery for the receiver portion independent of the equalization feedback to adjust the sampling.

15 Claims, 8 Drawing Sheets

(51) Int. Cl.
*H04L 7/033* (2006.01)
*H04L 7/027* (2006.01)

(56) References Cited

U.S. PATENT DOCUMENTS

| | | | |
|---|---|---|---|
| 7,782,932 | B2 | 8/2010 | Payne et al. |
| 9,048,999 | B2 | 6/2015 | He et al. |
| 2010/0238993 | A1 | 9/2010 | Huang et al. |
| 2011/0041008 | A1 | 2/2011 | Lee et al. |
| 2011/0099408 | A1 | 4/2011 | Yin et al. |
| 2013/0229294 | A1* | 9/2013 | Matsuno et al. ............... 341/155 |
| 2013/0315346 | A1* | 11/2013 | Varma et al. ................. 375/316 |
| 2014/0307769 | A1 | 10/2014 | He et al. |

FOREIGN PATENT DOCUMENTS

| | | |
|---|---|---|
| TW | I1516939 B | 1/2016 |
| TW | 201608376 A | 3/2016 |
| WO | WO-9809400 A1 | 3/1998 |
| WO | WO-2008085299 A1 | 7/2008 |
| WO | WO-2013158106 A1 | 10/2013 |

OTHER PUBLICATIONS

"U.S. Appl. No. 13/976,189, Notice of Allowance mailed Jan. 29, 2015", 10 pgs.

"U.S. Appl. No. 13/976,189, Preliminary Amendment filed Jun. 26, 2013", 8 pgs.

"U.S. Appl. No. 13/976,189, Response filed Nov. 24, 2014 to Non Final Office Action mailed Aug. 25, 2014", 10 pgs.

"International Application Serial No. PCT/US2012/034281, International Preliminary Report on Patentability mailed Oct. 30, 2014", 6 pgs.

"International Application Serial No. PCT/US2012/034281, International Search Report mailed Dec. 26, 2012", 3 pgs.

"International Application Serial No. PCT/US2012/034281, Written Opinion mailed Dec. 26, 2012", 3 pgs.

Mueller, K., et al., "Timing Recovery in Digital Synchronous Data Receivers", IEEE Transactions on Communications, 24(5), (May 1976), 516-531.

Spagna, F., et al., "A 78mW 11.8Gb/s serial link transceiver with adaptive RX equalization and baud-rate CDR in 32nm CMOS", 2010 IEEE International Solid-State Circuits Conference Digest of Technical Papers (ISSCC), (2010), 366-367.

"U.S. Appl. No. 13/976,189, Applicant's Summary of Examiner Interview filed Mar. 2, 2015", 1 pg.

"European Application Serial No. 12874749.0, Extended European Search Report mailed Nov. 18, 2015", 13 pgs.

"Taiwanese Application Serial No. 102113297, Office Action mailed May 22, 2015", 11 pgs.

Beukema. T. et al "A 6,4-Gb/s CMOS SerDes core with feed-forward and decision-feedback equalization", IEEE Journal of Solid-State Circuits, vol. 40, No. 12, (Dec. 1, 2005), 2633-2645.

Bulzacchelli, J F, et al., "A 78mW 11 1Gb/s 5-tap DFE receiver with digitally calibrated current-integrating summers in 65nm CMOS", Solid-State Circuits Conference—Digest of Technical Papers 2009. ISSCC 2009. IEEE International, IEEE, Piscataway, NJ, USA,, (Feb. 8, 2009), 368-369.

Chien, Ying-Ren, et al., "Reduction of loop delay for digital symbol timing recovery systems using asynchronous equalization", Circuits and Systems, 2009. ISCAS 2009. IEEE International Symposium on IEEE, Piscataway, NJ, USA, (May 24, 2009), 193-196.

Spagna, F, et al., "A 78mW 11.8Gb/s serial link transceiver with adaptive RX equalization and baud-rate CDR in 32nm CMOS", Solid-State Circuits Conference Digest of Technical Papers (ISSCC), 2010 IEEE International, IEEE, Piscataway, NJ, USA, (Feb. 7, 2010), 366-367.

* cited by examiner

UNEQUALIZED CLOCK DATA RECOVERY FOR SERIAL I/O RECEIVER

This application is a divisional of U.S. patent application Ser. No. 13/976,189, filed on Jun. 26, 2013, which is a U.S. National Stage Filing under 35 U.S.C. 371 from International Patent Application Serial No. PCT/US2012/034281, filed on Apr. 19, 2012, the benefit of priority of which is claimed hereby, and each of which is incorporated by reference herein in its entirety.

BACKGROUND

Over the last decade, engineers have been steadily increasing the data rate of high speed serial I/O implementations across various industry standards to satisfy the growing demands in enterprise and consumer applications. The current products haves been targeting 8-10 Giga Bit Per Second data rates. Receiver clock and data recovery architectures at such data rates are often complex and challenging. Architectures are evolving to improve both performance and power. There are two categories of prior art receiver architectures that are widely used in industry, clock and data recovery with Alexander phase detection and double rate sampling as illustrated in Prior Art FIG. 1, and symbol rate timing recovery methods using a Mueller-Müller principle as illustrated in Prior Art FIG. 2.

The receiver architecture utilizing Alexander type timing recovery implements double rate sampling as illustrated in FIG. 1. It typically consists of high-gain, high-bandwidth CTLE (continuous time linear equalizer amplifier), two phase interpolators (PI), data and edge samplers, and digital CDR (clock data recovery) blocks. Differential input signals RXP and RXN are amplified by CTLE and its output (outp and outn) drives both the data samplers and edge samplers. Two phase interpolators mix PLL input clocks and generate in-phase clock (clki) for data sampler to quantize CTLE outputs in the center of the unit interval (UI), and quadrature clock (clkq) for edge sampler to quantize CTLE outputs at the transition instance of the unit interval (UI). Matching clock buffers (CLKBUF) are put in to build clock trees for clki and clkq respectively. Samplers typically use both rising and falling edges of the clock to capture CTLE outputs, in which d0 is the even bit data sample at clki rising edge, d1 is the odd bit data sample at clki falling edge, e0 is the even bit edge sample at clkq rising edge, and e1 is the odd bit edge sample at clkq falling edge. Data samplers further generate a digital clock (clk) to bundle with d0, d1, e0, e1 to drive the downstream logic. The digital CDR block formulates Alexander phase detection using data and edge samples, and the phase error output drives a digital loop filter. The loop filter outputs are encoded into phase interpolator DAC (digital to analog converter) control codes (pi_dac1 and pi_dac2) to adjust the clock phase of the two phase interpolators respectively. Receiver architectures utilizing Alexander type timing recovery have been extensively used in the industry, however it faces growing design challenges when the data rate keeps increasing, as the 2× sampling requirement of the Alexander phase detection becomes less power efficient.

Symbol rate timing recovery using Mueller-Müller principles has been gaining more attraction in recent serial I/O receiver architectures. Typically such receivers consist of high-gain, high-bandwidth CTLE (continuous time linear equalizer amplifier) with automatic gain control (AGC), a DFE (decision feedback equalizer, either voltage or current integration type) with data and error-samplers, and clock-data-recovery circuits based on a Mueller-Müller algorithm. The Mueller-Müller CDR algorithm requires sampling per unit-interval (UI), compared to double sampling (center and edge of the UI) required by "data-edge" based CDRs and therefore needs fewer number of samplers and is more area and power efficient. Such an architecture using CTLE with AGC, DFE, Mueller-Müller CDR algorithm, and Least-mean-square (LMS) based optimization is demonstrated in FIG. 2. The differential input signals RXP and RXN are amplified by CTLE and its output (outp and outn) drives the decision feedback equalizer (DFE). A single phase interpolator mixes PLL input clocks and generates in-phase clock output (clki). Clki is distributed through a clock tree network (CLKBUF) for samplers to quantize equalizer outputs (vxp and vxn) into data and error bits. The samplers further generate a digital clock (clk) to bundle with data and error for the downstream logic. The digital CDR block formulates Mueller-Müller algorithm using data and error bits, and the phase error output drives a digital loop filter. The loop filter outputs are encoded into phase interpolator DAC control codes (pi_dac1) to adjust the clock phase of the phase interpolator. In the meanwhile, the digital LMS block utilizes the same data and error bits to adjust the gain of CTLE by control signal AGCCoef and the equalization by control signal DFECoef. The optimization mechanism is designed to minimize the mean squared voltage error of the DFE differential output (vxp−vxn) against the reference voltage level of the error samplers. In summary, both the Mueller-Müller CDR Loop and AGC-DFE loop converge concurrently based on equalized samples that come out of the DFE, resulting in CDR and DFE loop interactions. This architecture may be referred to as "equalized MM CDR". The inherent loop interactions can negatively impact the performance and stability of this equalized MM CDR receiver architecture.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in a semiconductor device or a combination of hardware and firmware in one embodiment. Further, such functions correspond to modules, which are software stored on a storage device, hardware, firmware or any combination thereof. Multiple functions may be performed in one or more modules as desired, and the embodiments described are merely examples. The functions or algorithms may be implemented in the serial I/O receiver of a digital signal processor, ASIC, microprocessor, or other type of devices operating on a computer system, such as a personal computer, server or other computer system.

Figure 1:
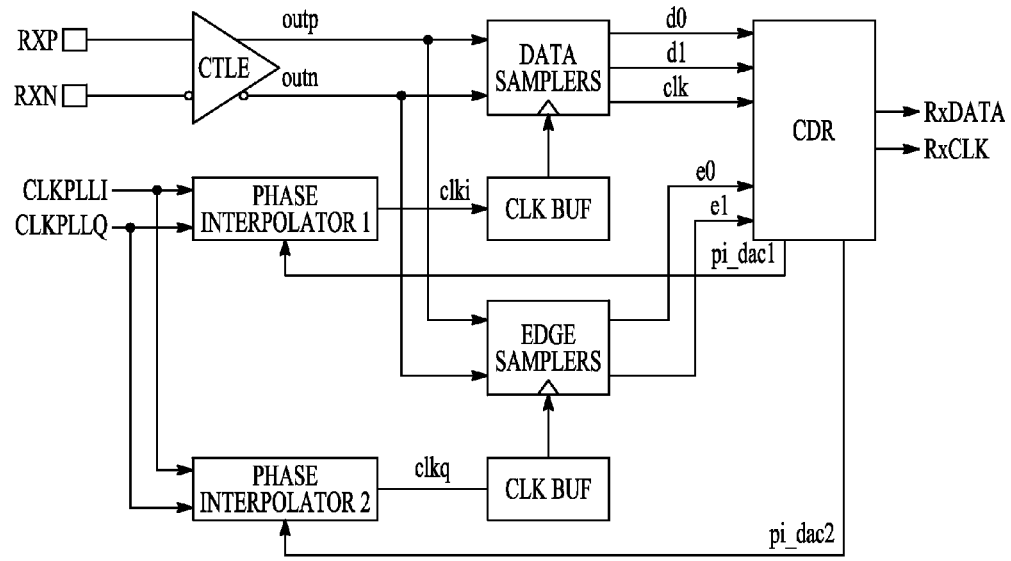
FIG. 1 is a prior art diagram of a clock and data recovery system using Alexander phase detection and 2× sampling.
Figure 2:
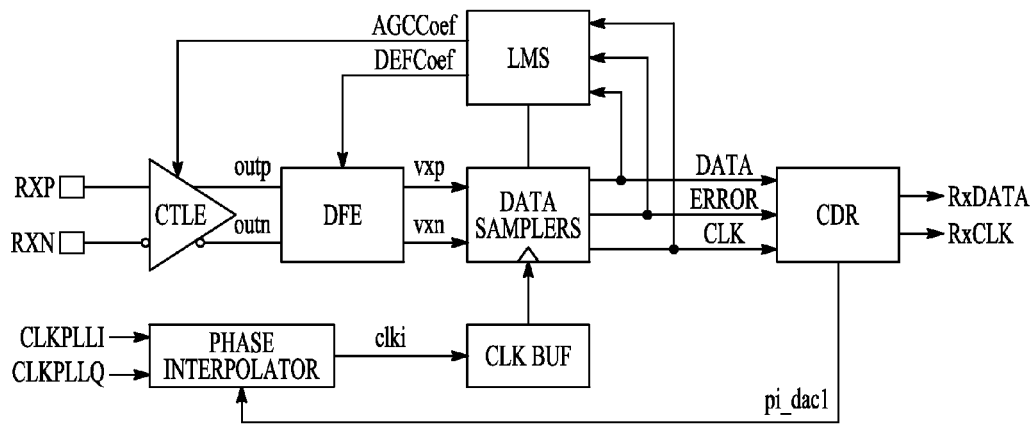
FIG. 2 is a prior art diagram of a clock and data recovery system using Mueller-Müller phase detection and symbol rate sampling.
Figure 3:
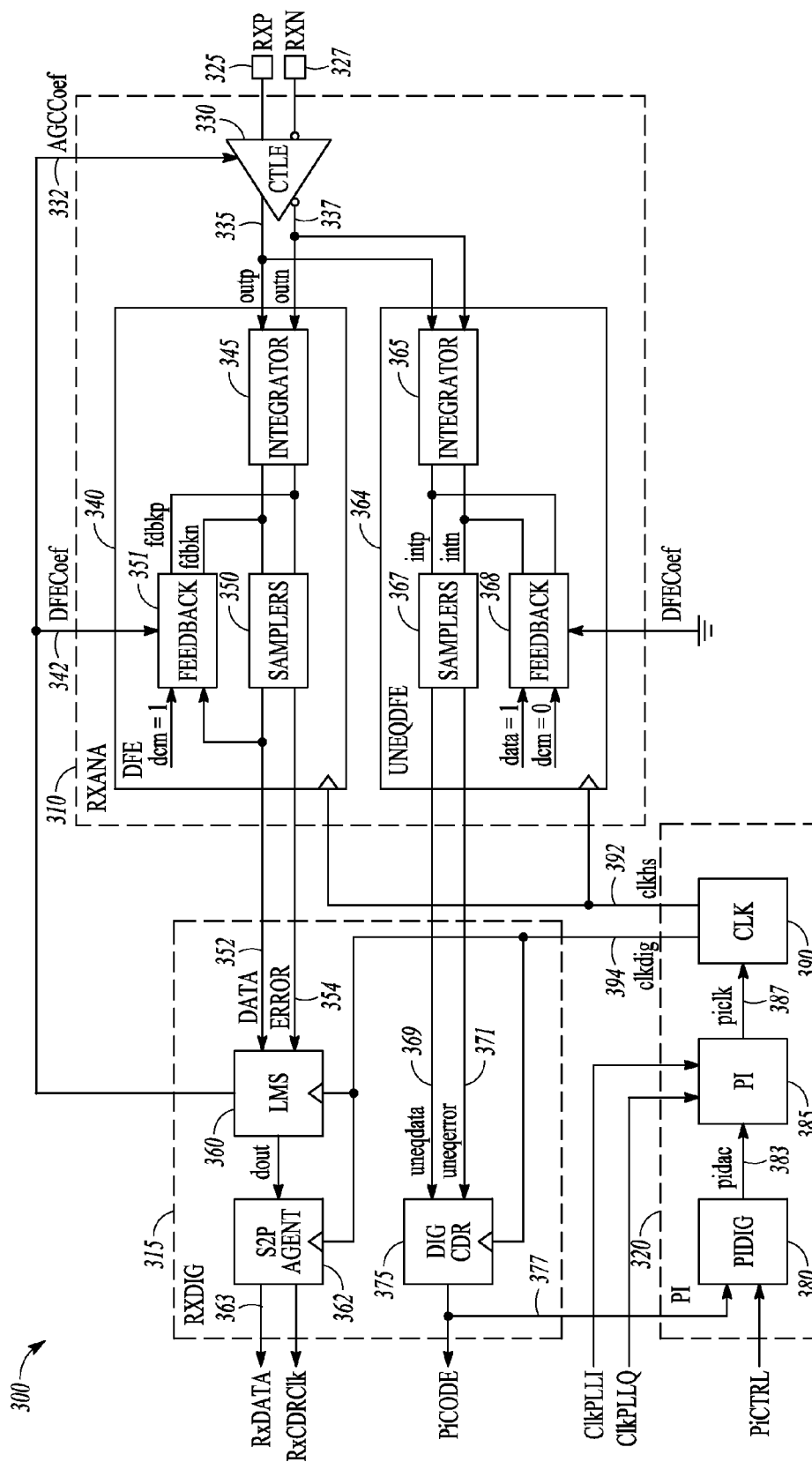
FIG. 3 is a block schematic diagram of a high speed serial receiver having separated equalizer and timing feedback loops according to an example embodiment.

FIG. 3 is a block diagram of a receiver 300 implementing unequalized clock recovery. Receiver 300 includes a first receiver portion to receive a serial input signal. In one embodiment, the first receiver portion handles the serial input signal and may use analog circuits and optionally digital components to implement circuits to handle the input signal. The first portion may be referred to as an analog receiver portion (RXANA) block 310 indicated by a broken line. Block 310 is coupled to a second portion, similarly referred to as a digital receiver portion (RXDIG) block 315, also indicated by a broken line. Generally, block 310 handles analog input signals and converts the signals to digital signals that are processed by block 315. A timer block 320, indicated by a broken line, provides timing signals to the block 310 in one embodiment. The timer block 320 may also provide timing signals to the block 315 in some embodiments.

An analog differential serial input signal is provided on input terminals 325, 327 to a continuous time linear equalizer amplifier (CTLE) 330. In one embodiment, the amplifier 330 has a variable gain input 332 that receives an automatic gain control coefficient (AGCCoef). Amplifier 330 provides a differential signal on outputs 335, 337 to a decision feedback equalizer (DFE) 340. The equalizer 340 is adjusted by a decision feedback equalizer coefficient (DFECoef) at 342.

The analog differential input signals have a difference in voltage that is representative of a digital "1" or digital "0" depending on the voltage difference between the differential signals. In one embodiment, equalizer 340 includes an integrator 345, which integrates the difference in differential signal from lines 335 and 337 for a selected amount of time. The selected amount of time may be varied depending on the length of time the input differential signal represents a single digital value being received, essentially recovering signal strength that may have been lost from the point of transmission of the received signal. For example, in one embodiment, the received signal may originate from a graphics card that is coupled to a system board, and may be received at a processor on the system board. Some of the transmitted signal may be lost due to resistance and dispersion as well as noise that may be introduced as the signal travels along the path to the receiver 300.

Once the differential signal has been integrated by integrator 345, it is provided to samplers 350 for sampling the signal against a selected set of references, such as reference voltages. In one embodiment, there are two data samplers and four error samplers.

The data samplers 350 in one embodiment determine whether the difference in integrated voltage between signals corresponding to the respective logic values is above or below 0 mV. A digital data signal is provided on a line 352, where a difference larger than zero may be represented by a "1" and a difference below zero may be represented by a "0".

The error samplers 350 in one embodiment determine whether the difference in integrated voltage between signals corresponding to the respective logic values is above or below a threshold voltage level, such as +/−100 mV, +/−150 mV, or other selected value that may depend on implementation details in various embodiments. A digital error signal is provided on a line 354, where a difference larger than the threshold may be represented by a "1" and a difference below the threshold may be represented by a "0".

The logic levels for the data and error information may be reversed in various embodiments or encoded in various schemes such that at different times, the logic levels are reversed.

The data 352 and error 354 signals are provided to a least mean square (LMS) error block 360, which minimizes the error and provides the digital feedback equalizer coefficient 342 and automatic gain control coefficient 332 to the equalizer 340 and amplifier 330 respectively, forming a decision feedback equalizer loop to adjust parameters of the analog receiver block 310. Equalizer 340 includes a feedback block 351 that receives the feedback equalizer coefficient 342 and data 352, and provides feedback to be summed at the inputs of samplers 350.

LMS block 360 also provides signals to a serial to parallel (S2P) agent 362 to provide a receiver data (RxData) output signal on a parallel output line 363 completing the conversion of an analog serial input signal to a digital parallel output signal.

A clock data recovery block 375 provides a signal labeled PICode on line 377 to a digital control circuit 380 labeled PIDIG. The digital control circuit 380 provides a control signal 383 labeled pi_dac code to a phase interpolator (PI) block 385, which mixes PLL clocks (ClkPLLI and ClkPLLQ) according to pi_dac code, and provides a clock signal 387 labeled piclk to a clock generator 390 to provide both a clock signal clkhs 392 to analog circuitry including a separate feedback unequalizer 364 and equalizer 340, and a clock signal clkdig 394 to digital circuitry including CDR 375, S2P 362, and LMS 360.

In one embodiment, the separate feedback unequalizer block 364 including an integrator 365, samplers 367, and feedback 368, is provided and coupled to the amplifier 330 outputs 335 and 337. The separate integrator 365 and samplers 367 produce digital data and digital error signals on lines 369 and 371 respectively, labeled unequalized data (uneqdata) and unequalized error (uneqerror). These signals are separate from signals on 352 and 354, and are not subjected to the adjustments provided via a feedback loop to integrator 345 and samplers 350. The uneqdata and uneqerror signals are provided to the clock data recovery block 375 that implements a Mueller-Müller algorithm for clock data recovery. The separation of the feedback loops in some embodiments improves the stability of the receiver 300 when the previously used combined feedback loop may result in loop interaction.

The inventors have determined that providing the same data and error signals to perform both LMS equalization adjustment and clock data recovery (CDR) as previously done, could create undesirable interactions between the receiver decision feedback equalizer loop and symbol rate timing recovery. Such interaction can become very pronounced and adversely impact link training. Some observed difficulties include boot-to-boot variations, link width degradation and link training failures.

In one embodiment, the separate unequalizer block 364 may be identical in structure to the equalizer block 340, except some inputs to block 364 are reconnected as illustrated in FIG. 3. By using the same structure in the equalizer and unequalizer blocks, this circuit architecture ensures internal signal characteristics, such as timing delays, are matched. The only difference is that feedback from data outputs to the sampler inputs are removed in the unequalizer block 364.

Figure 4:
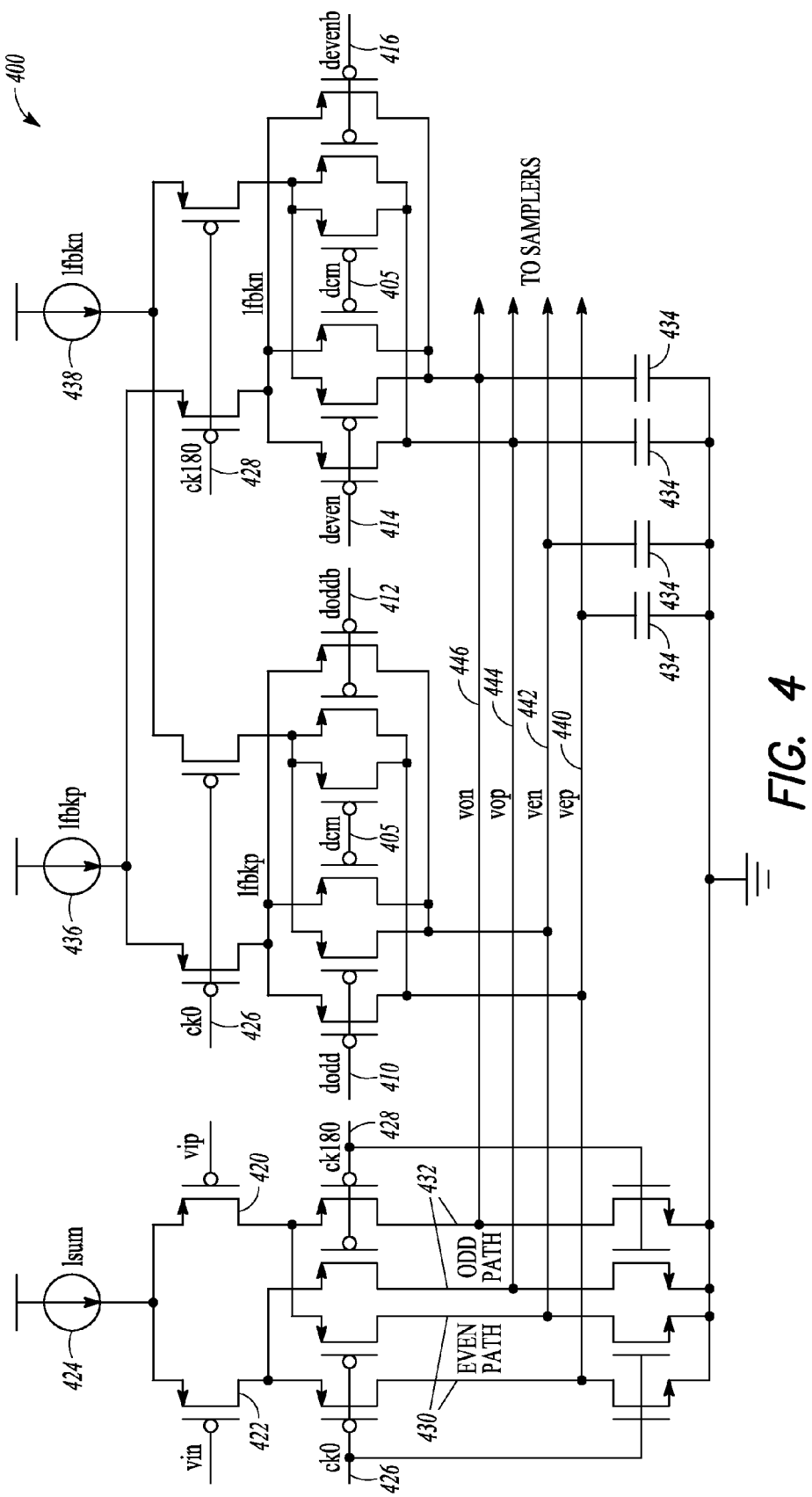
FIG. 4 is a circuit diagram for implementing a decision feedback equalizer capable of operating in both an equalized and an unequalized mode according to an example embodiment.

In one embodiment, a circuit for implementing a decision feedback equalizer capable of operating in both an equalized and an unequalized mode corresponding to blocks 340 and 364 respectively for analog matching is illustrated at 400 in FIG. 4. Only one feedback tap is shown for simplicity.

To operate in an equalized mode corresponding to DFE 340, dcm indicated at 405 is set to a 1, and inputs labeled dodd 410, doddb 412, deven 414 and devenb 416 are connected to sampler outputs, The DFECoef 342 is controlled by LMS 360, according to an example embodiment.

To operate in an unequalized mode for implementation of unequalizer 364, dcm 405 is set to 0, and dodd 410, doddb 412, deven 414 and devenb 416 are tied to logic "1", DFECoef is grounded, according to an example embodiment.

In one embodiment, circuit 400 utilizes a half-rate current integrating structure. Its input differential pair (vip 420 and vin 422) converts the CTLE output voltages into currents. The total current in this input integration stage equals to Isum as indicated at 424. Half rate clocks ck0 at 426 and ck180 at 428 steer the converted currents into even 430 and odd 432 paths respectively, and control charging or discharging the corresponding capacitive loads 434. The equalization is realized in the form of differential feedback currents Ifbkp 436 and Ifbkn 438. The difference of Ifbkp and Ifbkn is determined by DFECoef while their sum is a constant. Similar to the input integration stage, half rate clocks ck0 at 426 and ck180 at 428 steer the feedback currents into even and odd paths respectively. During equalization mode, the differential feedback currents Ifbkp and Ifbkn are integrated into capacitive loads 434, controlled by dodd 410, doddb 412, deven 414, and devenb 416, to generate the equalized outputs vep 440, ven 442, vop 444 and von 446 respectively. During unequalized mode, the differential feedback is removed but the common mode currents are still integrated into capacitive loads 434 to generate the unequalized outputs vep 440, ven 442, vop 444, and von 446 respectively. Sampler data outputs are bypassed to avoid unnecessary switching during integration period.

Utilizing the same circuit for both equalizer and unequalizer helps minimize differences in performance that may arise in fabricating different circuits. Circuit 400 may be implemented in one embodiment with field effect transistors, such as p type or n type transistors. In further embodiments, bipolar transistors may be used. Instead of implementing current integrating structures in this embodiment, a voltage mode structure using resistive loads can be designed in further embodiments. Instead of using PMOS input and switching pairs in this embodiment, further embodiments may utilize a duel topology with NMOS inputs and switching pairs. Instead of using half rate clocking schemes in this embodiment, a quad-rate clocking schemes can be used to expand even and odd integration paths into four phase integration paths in further embodiments.

Receiver 300 demonstrates at the conceptual level, an unequalized Mueller-Müller CDR or simply uneqMM architecture. Amplifier 330 output is sampled into uneqdata and uneqerror by the unequalizer 364. The uneqMM CDR 375 is then driven by uneqdata and uneqerror, while LMS 360 is still driven by the equalized DFE 340 outputs. Loop interaction is thus minimized. In one embodiment, there is an offset in equalized MM CDR formulation, and it is introduced by DFE 340 first tap coefficient when the input data is uncorrelated, i.e., $$E\{\phi(n)\}=w_0 E\{\varphi(n)\}-w_1 \quad (1)$$

φ is the phase error function of the unEqMM CDR, φ is the phase error function of the EqMM CDR, $w_0$ is AGC Gain, $w_1$ is DFE first tap feedback, $E\{\cdot\}$ denotes statistical average, and assuming input data is uncorrelated.

Figure 5:
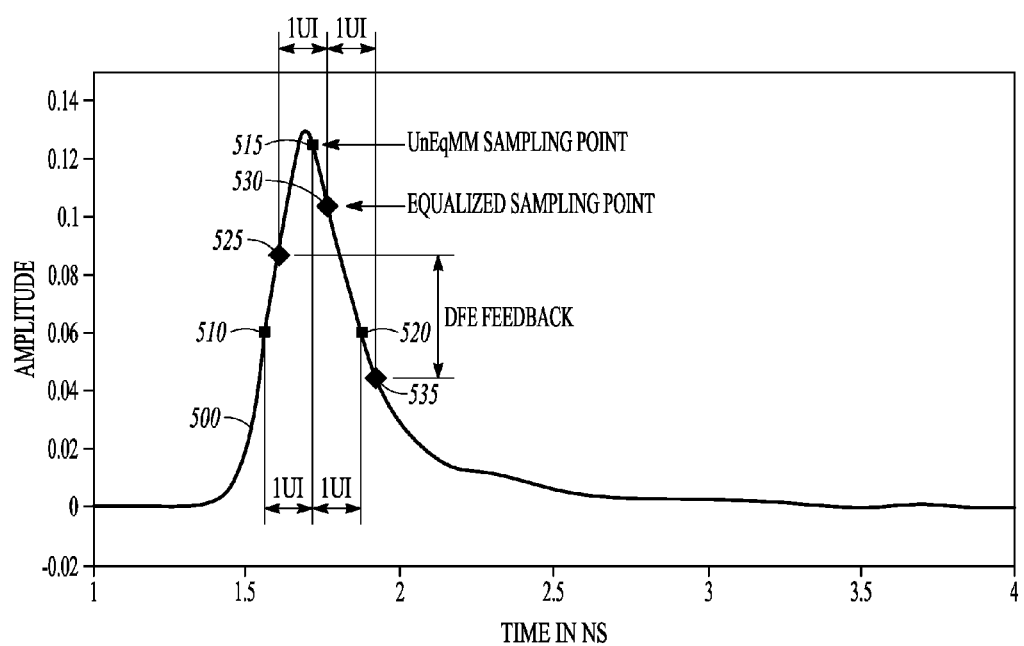
FIG. 5 illustrates a combined pulse response observed at the outputs of a signal amplifier according to an example embodiment.

FIG. 5 is a visual representation of the phase offset introduced by the equalized timing recovery as demonstrated by equation (1), according to one or more embodiments. The x-axis represents time while the y-axis represents voltage. In one embodiment, FIG. 5 illustrates a combined pulse response including interconnect, and silicon package and CTLE gain path that is observed at CTLE 330 outputs in amplitude versus time. The illustrated response is fairly symmetric, and indications are provided for both unequalized Mueller-Müller sampling point 515 and prior equalized Mueller-Müller sampling points 530. The representation shows that as data rates increase, differences in sampling times of 10 to 20 picoseconds or less can adversely affect the performance of a receiver.

In one embodiment, the Mueller-Müller CDR formulates a phase error function that compares the voltage difference between pulse response levels 1UI (one unit interval—the time during which a sample is integrated in one embodiment) before and 1UI after the sampling point. In the prior equalized Mueller-Müller CDR, equalization introduces an offset voltage in the phase error function. Although the phase error function settles to zero in the average sense after convergence, this offset voltage pushes points 525 and 535 away from being equal. The difference in voltage between points 525 and 535 is the DFE equalization feedback voltage. This feedback voltage is completely determined by the DFE first tap according to some embodiments, regardless of the existence of the other taps, as long as the incoming data is uncorrelated. The offset between points 525 and 535 of the equalized Mueller-Müller CDR pushes the sampling point 530 away from the peak of the pulse response, which may suffer a drop in Signal-to-Noise Ratio (SNR) at the integrator inputs. The reduction in SNR becomes even more prominent in higher loss channels which require stronger equalization, hence resulting in larger offset in the sampling point away from the peak of the pulse response. In the unequalized Mueller-Müller CDR, the phase error function converges to zero in the average sense such that points 510 and 520 having equal amplitudes, since there is no equalization applied to the pulse response in FIG. 5, or the applied equalization has been removed before phase detection, according to the embodiments of the invention. As a result, the sampling point 515 is at the peak of the pulse response which has the highest Signal-to-Noise ratio.

Receiver 300, in essence, is a direct implementation of the concept of separating the feedback loops such that no equalization effect is added to the signal path used in clock recovery loop. Receiver 300 utilizes additional data and error samplers, and an integrator. The extra circuitry carries the expense of extra silicon power and area. When multiple lanes are used, the expenses are multiplied, which can result in a larger die size.

Figure 6:
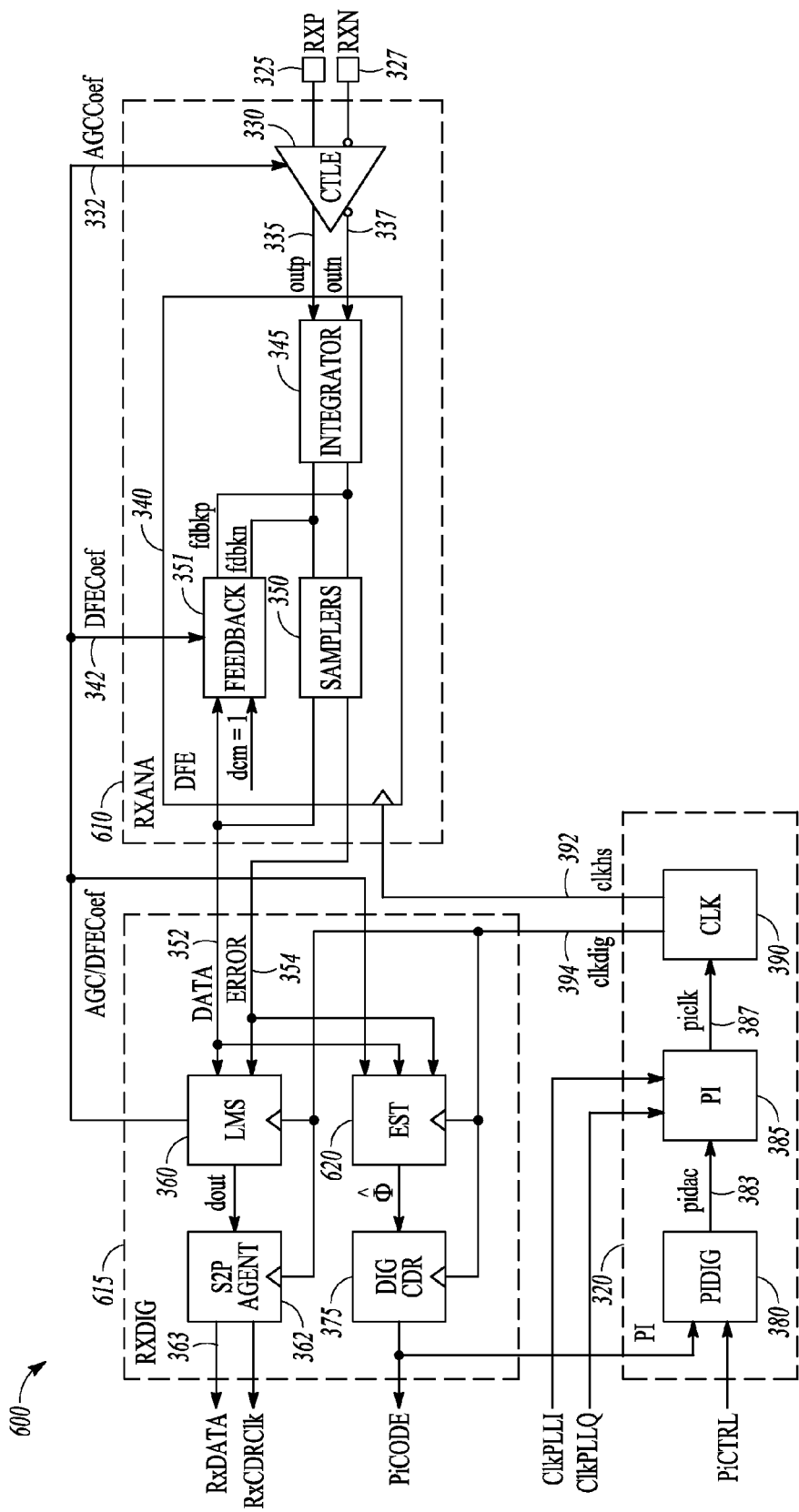
FIG. 6 is a block schematic diagram of a high speed serial receiver having an equalizer feedback loop and digital phase estimation according to an example embodiment.

FIG. 6 illustrates an alternative receiver 600 utilizing a digital approach to estimate an unequalized MM phase error without additional sampler circuits. Many of the components may be the same as those used in FIG. 3, and are given like reference numbers where appropriate. Receiver 600 includes a first block, such as an analog receiver (RXANA) block 610 indicated by a broken line, coupled to a second block, such as a digital receiver (RXDIG) block 615, also indicated by a broken line. Blocks 610 and 615 may be implemented with analog and digital components in various embodiments. Generally, block 610 handles analog input signals and converts the signals to digital signals that are processed by block 615. A timer block 320, indicated by a broken line, provides timing signals 392 to the block 610 in one embodiment. The timer block 320 may also provide timing signals 394 to the block 615 in some embodiments.

As in receiver 300 of FIG. 3, an analog differential serial input signal is provided on input terminals 325, 327 to a continuous time linear equalizer amplifier (CTLE) 330. In one embodiment, the amplifier 330 has a variable gain input 332 that receives an automatic gain control coefficient (AGCCoef). Amplifier 330 provides differential signal outputs 335, 337 to a decision feedback equalizer 340. The equalizer 340 also receives decision feedback equalizer coefficients (DFECoef) at 342 via feedback block 351.

In one embodiment, equalizer 340 includes the integrator 345, samplers 350, and feedback block 351 to provide the data and error signals on lines 352 and 354. The data 352 and error 354 signals are provided to the least mean square (LMS) error optimization block 360, which minimizes the error and provides the digital feedback equalizer coefficient 342 and automatic gain control coefficient 332 to the equalizer 340 and amplifier 330 respectively, forming a decision feedback equalizer loop.

In receiver 600, the data and error signals on lines 352 and 354 are also provided to a digital estimator block 620 which is inserted into the block 615. In one embodiment, the digital estimator block 620 provides a digital estimation of phase error to the clock data recovery block 375 that is the same as the analog unequalized MM of receiver 300 in an average sense, but without the extra power and area consumption of providing additional analog circuitry to create the separate loop.

In one embodiment, the digital estimator block 620 implements the following method of estimating the phase error. The estimation of unEqMM phase error is defined as $\hat{\phi}$ $$w_0 \hat{\phi}(n) = \phi'(n) + (1 - E\{d_n d_{n-2}\}) w_1. \tag{2}$$

The estimated unEqMM phase error is the same as the analog unequalized MM in the statistical average sense, i.e., $$E\{\hat{\phi}(n)\} = E\{\phi(n)\}. \tag{3}$$

If assuming the input data is uncorrelated, the digital estimator 620 can be simplified to $$w_0 \hat{\phi}(n) = \phi'(n) + w_1. \tag{4}$$

$\hat{\phi}$ is the estimator of the phase error function of the unequalized CDR, while $\phi$ denotes the original uneqMM phase error function, and $\phi'$ is the phase error function of the equalized CDR. $w_0$ denotes AGC Gain, $w_1$ denotes DFE first tap feedback, $d_n$ is the incoming data, and $E\{\cdot\}$ denotes statistical average operator.

Receivers 300 and 600 in some embodiments improve link stability of high speed serial I/O's. They also help the receiver work with a wider range of end-point transmitter presets and coefficients to further help electrical margin improvement, link stability, and performance. Transmitters with multi-tap equalization for higher data rates may have inherent inaccuracy in equalization levels. Robust operation with wider equalization coefficient range improves the interoperability with various vendors of graphics cards and other link partners.

Figure 7:
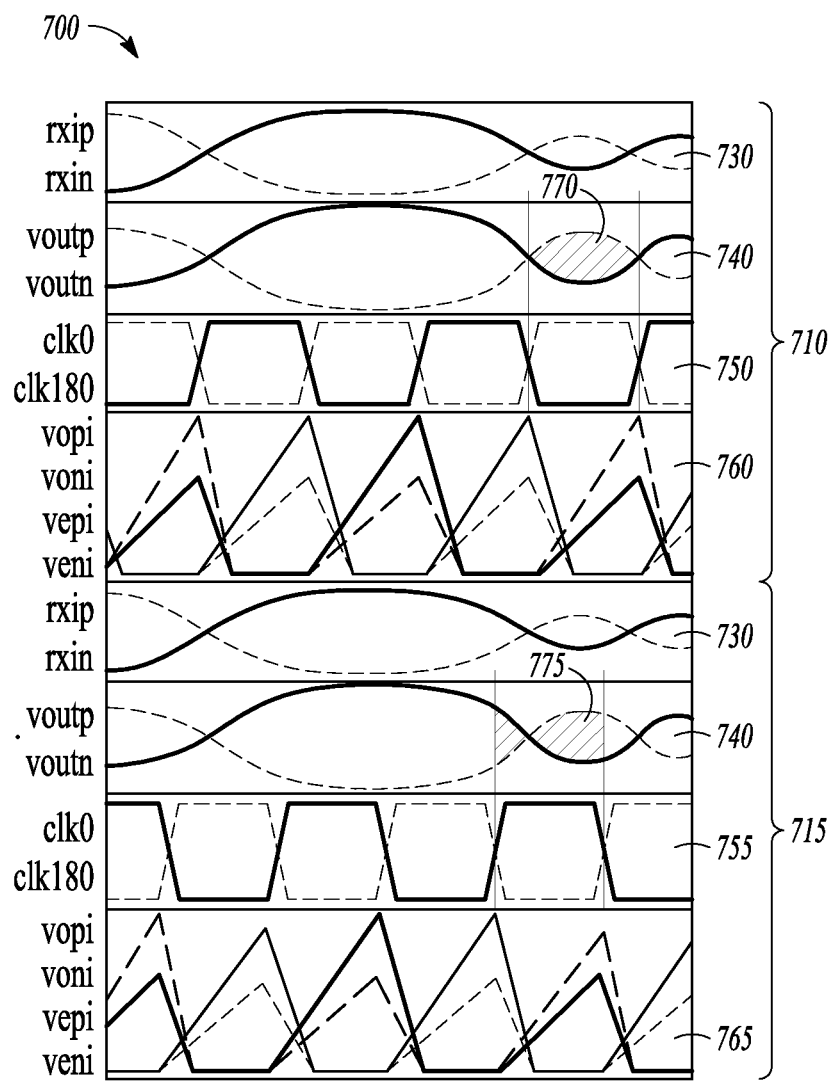
FIG. 7 illustrates example timing diagrams for equalizer outputs and recovered clocks according to an example embodiment.

FIG. 7 is a timing diagram 700 of receiver 300 and receiver 600, according to some embodiments, illustrating phase alignment of the unequalized Mueller-Müller clock data recovery. Unequalized clock data recovery signals are generally indicated at 710, with equalized clock data recovery signals indicated at 715. The x-axis represents time while the y-axis represents voltage. The rxp and rxn waveforms 730 are receiver differential inputs. The outp and outn waveforms 740 are CTLE differential outputs which drive the integrator inside equalizer block 340. ck0 and ck180 waveforms 750 are sampling clocks. The phase of ck0 and ck180 clocks 750 is adjusted by the unequalized Mueller-Müuller clock recovery loop. Vop, von, vep, and ven waveforms 760 are integrator outputs in block 340. In one embodiment, the clock signals indicated at 750 of the unequalized clock and data recovery are aligned with the CTLE output signals 740 so that the clock signals transition near the zero crossing of the CTLE output signals. This allows integration to capture the complete unit interval (UI) of receiver input signal in phase, as illustrated by the shaded area 770.

However, in prior equalized circuitry, as indicated at 715, the clock signal 755 is significantly out of phase with the CTLE output signals 740, resulting in integrating only portion of the current UI, as illustrated by the shaded area 775, and artificially reducing Signal-to-Noise ratio at the integrator inputs. The misalignment in clock phase 755 is introduced by the equalization feedback according to equation (1) in some embodiments, which may become stronger in higher loss channels. A stronger equalization feedback increases phase misalignment further, which may in turn trigger even higher equalization feedback. Such equalized clock recovery circuitry is likely producing link stability problems and higher bit error rate.

Figure 8:
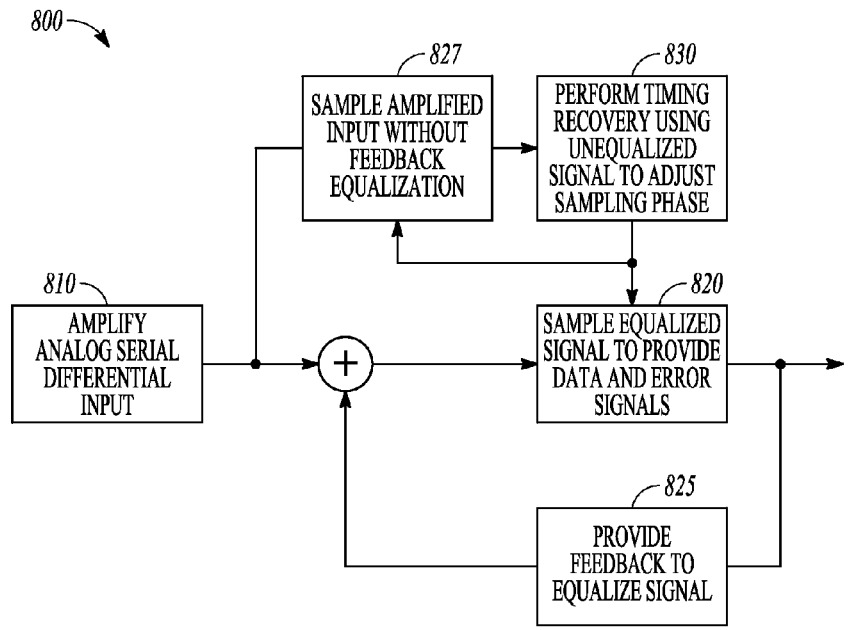
FIG. 8 is a block flow diagram of a high speed serial receiver having separated equalizer and timing feedback loops according to an example embodiment.

FIG. 8 is a block flow diagram illustrating a method 800 of performing unequalized clock recovery for a serial I/O receiver corresponding to receiver 300. At 810, an analog differential serial input is received. The signal may be amplified and integrated in some embodiments, and sampled at 820 to provide data and error signals. Feedback as a function of a least mean squares error optimization is provided at 825 to equalize or adjust the sampling. Input without equalization is provided at 827, where the amplified analog serial differential output is sampled without feedback equalization. At 830, timing recovery for adjusting the sampling phase for sampling in 825 and 827 is performed on the sampled input from 827 independent of the feedback to adjust equalization.

Figure 9:
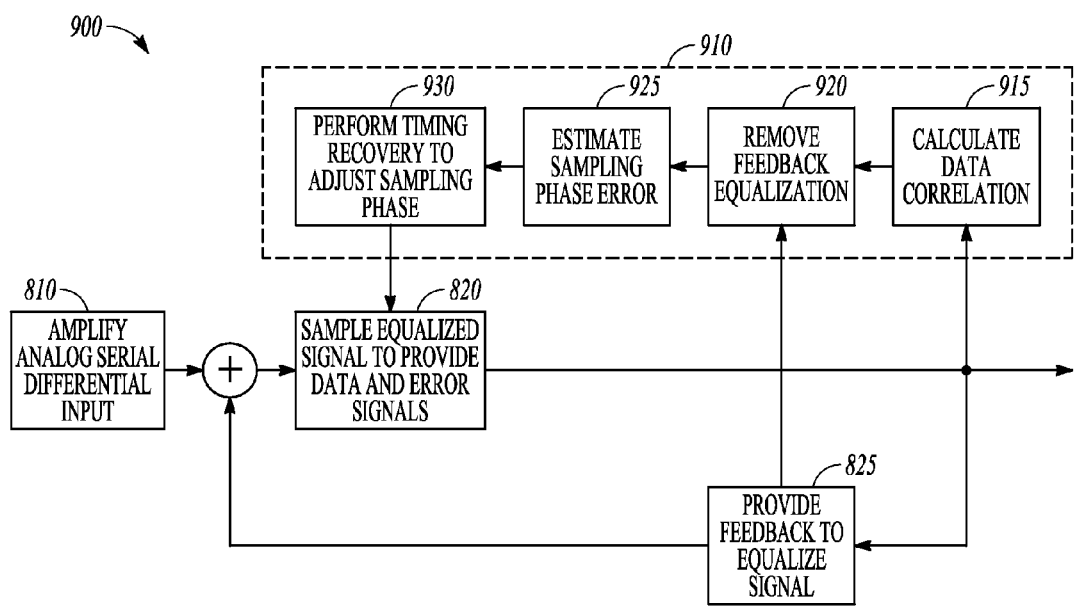
FIG. 9 is a block flow diagram of a high speed serial receiver having an equalizer feedback loop and digital phase estimation according to an example embodiment.

FIG. 9 is a block flow diagram of a method 900 of performing unequalized clock recovery for a serial I/O receiver corresponding to receiver 600. Some blocks are numbered the same as corresponding blocks in FIG. 8, including blocks 810, 820, and 825 to provide feedback to equalize the signal. In addition, a broken line 910 is used to illustrate removing equalization and estimating phase utilizing the equalized signal from block 820. In one embodiment, the equalized signal from 820 is provided to a block 915 to calculate data correlation. The calculated data correlation is combined with the feedback from block 825 at block 920 to remove feedback equalization. At 925, an output from block 920 with the feedback equalization removed is used to estimate a sampling phase error. At 930, the sampling phase error is provided to block 930 to perform timing recovery to adjust the sampling phase, which is then provided to block 820 for sampling at the proper interval.

Figure 10:
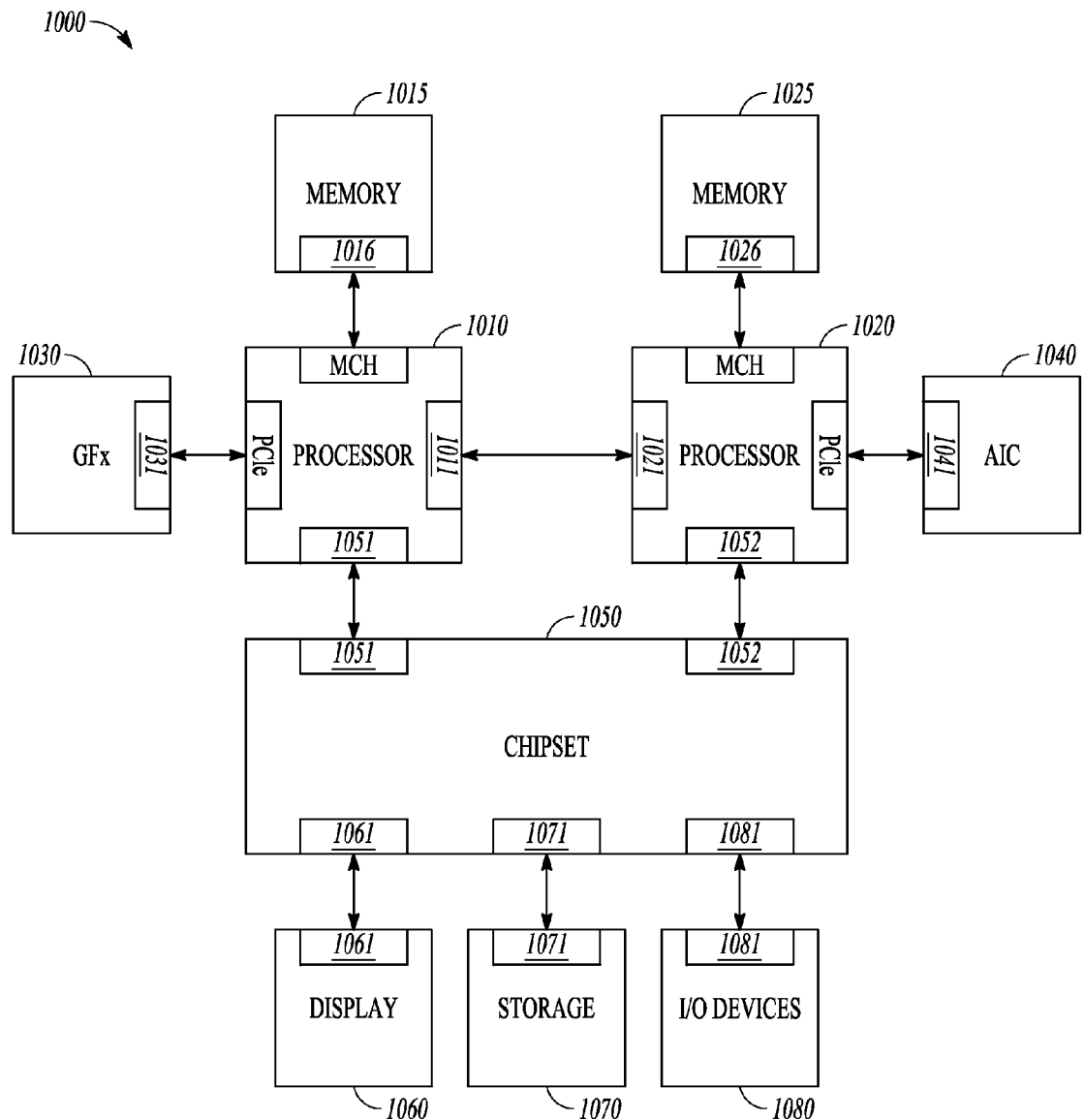
FIG. 10 is a block diagram illustrating various embodiments utilizing a serial receiver according to an example embodiment.

FIG. 10 is a block diagram illustrating a system 1000 utilizing one or more serial receivers. The serial receivers may be part of a transceiver that includes circuitry to transmit and receive signals on a serial connection. System 1000 may be any type of electronic products that couples components via various connections, including for example, serial connections. Examples include, but are not limited to, a desktop computer, a laptop computer, a server, a workstation, a smart phone, a tablet, and many other devices. The system 1000 implements the methods disclosed herein and may be a system on a chip (SOC) device.

In one embodiment, the system 1000 includes multiple processors including 1010 and 1020, where processor 1010 has logic similar or identical to logic of processor 1020. In one embodiment, processor 1010 and 1020 includes a memory control hub (MCH), which is operable to perform functions that enable the processors to access and communicate with memory modules 1015 and 1025. In one embodiment, system 1000 includes a Graphics module (GFx) 1030, an Add-in-Card (AIC) 1040, and a chipset module 1050. In one embodiment, the processor 1010 and 1020 includes serial receiver 300 of FIG. 3 and receiver 600 of FIG. 6. In one embodiment, the processor 1010 and 1020 uses the receiver 300 and receiver 600 to communicate with each other, and with the memory modules 1015 and 1025, and with GFx module 1030 and AIC 1040, and with chipset 1050 on interfaces 1011, 1021, 1016, 1026, 1031, 1041, 1051 and 1052 in accordance with I/O communication protocols such as the QuickPath Interconnect (QPI), Direct Media Interface (DMI), Peripheral Component Interconnect Express (PCIe) interface, FB-DIMM Point-to-Point Serial Interface or the like.

In one embodiment, the chipset 1050 includes serial receiver 300 of FIG. 3 and receiver 600 of FIG. 6. In one embodiment, chipset 1050 connects with processors 1010 and 1020 via I/O interfaces 1051 and 1052 using receiver 300 and receiver 600. In one embodiment, chipset 1050 enables processor 1010 and 1020 to connect to other modules in the system 1000. In one embodiment, the chipset 1050 uses receiver 300 and receiver 600 to communicate with display device 1060, mass storage device 1070, and other I/O devices 1080 etc.

In one embodiment, a display device 1060 includes serial receiver 300 of FIG. 3 and receiver 600 of FIG. 6. In one embodiment, display device 1060 communicates with chipset via an interface 1061. In one embodiment, the display 1060 includes, but is not limited to, liquid crystal display (LCD), plasma, cathode ray tube (CRT) display, or any other form of visual display device.

In one embodiment, the mass storage device 1070 includes, but is not limited to, a solid state drive, a hard disk drive, a universal serial bus flash memory drive, or any other form of computer data storage medium. In one embodiment, other I/O devices include network interface, a universal serial bus (USB) interface, a Peripheral Component Interconnect Express (PCIe) interface, and/or any other suitable type of interface. In one embodiment, receiver 300 of FIG. 3 and receiver 600 of FIG. 6 may be used in serial I/O interfaces 1071 and 1081 to establish communications among chipset, storage, and other devices.

While the modules shown in FIG. 10 are depicted as separate blocks within the system 1000, the functions performed by some of these blocks may be integrated within a single semiconductor circuit or may be implemented using two or more separate integrated circuits. For example, processor 1010, 1020, and chipset 1050 may be merged into a single SOC. In one embodiment, the system 1000 may include more than two processors and memory modules in another embodiment of the invention.

Several examples are now described. Structures and methods described in the examples may be used anywhere in one or more embodiments.

Example 1 may include an input/output receiver includes a receiver portion to receive an analog differential serial input and sample the input to provide at least one signal, an equalization feedback loop responsive to at least one signal to adjust the receiver portion, a phase feedback mechanism separate from the equalization feedback loop to provide a phase error, and a clock data recovery block coupled to receive the phase error to perform timing recovery for the receiver portion.

Example 2 may include the receiver of example 1 where the phase feedback mechanism includes a separate integrator and samplers to provide unequalized signals to the clock data recovery block, wherein the signal and unequalized signals are data and error signals. Example 3 may include the receiver of example 1 or 2 wherein the receiver portion further includes a continuous time linear equalizer amplifier coupled to receive the differential serial analog input.

Example 4 may include the receiver of example 3 wherein the amplifier receives an automatic gain control coefficient via the equalization feedback loop. Example 5 may include the receiver of example 3 or 4 wherein the receiver portion further includes a decision feedback equalizer coupled to an output of the amplifier, wherein the decision feedback equalizer receives a decision feedback equalizer coefficient via the equalization feedback loop and provides data and error signals.

Example 6 may include the receiver of example 5 wherein the equalization feedback loop includes a least mean squares error optimization block to receive the data and error signals from the decision feedback equalizer, and provides the automatic gain control coefficient and decision feedback equalizer coefficient.

Example 7 may include the receiver of example 6 wherein the separate integrator and samplers of the phase feedback mechanism are coupled to the output of the amplifier. Example 8 may include the receiver of example 7 wherein the clock and data recovery based on the unequalized data and error signals corrects the sampling phase offset introduced by a decision feedback equalization:

$$w_0 E\{\phi(n)\} = E\{\varphi(n)\} + w_1$$

where $\phi$ is the phase error function of the unequalized CDR, $\varphi$ is the phase error function of the equalized CDR, $w_0$ is AGC Gain, $w_1$ is DFE first tap feedback, and $E\{\cdot\}$ denotes statistical average.

Example 9 may include the receiver of example 8 wherein the phase offset is completely determined by the DFE first tap, regardless of the existence of the other taps, as long as the incoming data is uncorrelated. Example 10 may include the receiver of any of examples 1-9 wherein the phase feedback mechanism comprises a digital estimator to provide a digital estimation of phase error to the clock data recovery block. Example 11 may include the receiver of example 10 wherein the receiver portion further includes a continuous time linear equalizer amplifier coupled to receive the differential serial analog input, wherein the amplifier receives an automatic gain control coefficient via the equalization feedback loop.

Example 12 may include the receiver of example 11 wherein the receiver portion further includes a decision feedback equalizer coupled to an output of the amplifier, wherein the decision feedback equalizer receives a decision feedback equalizer coefficient via the feedback loop and provides data and error signals, and wherein the equalization feedback loop includes a least mean squares error block to receive the data and error signals from the decision feedback equalizer, and provides the automatic gain control coefficient and decision feedback equalizer coefficient.

Example 13 may include the receiver of example 12 wherein the digital phase error estimator is defined as:

$$w_0 \hat{\phi}(n) = \phi'(n) + (1 - E\{d_n d_{n-2}\}) w_1 \hat{\phi}$$

where is the estimator of the phase error function of the unequalized CDR, while $\phi'$ is the phase error function formulated by using the equalized data and error signals, $w_0$ denotes AGC Gain, $w_1$ denotes DFE first tap feedback, $d_n$ is the incoming data, and $E\{\cdot\}$ denotes statistical average operator. Example may include a serial I/O receiver including an receiver portion to receive an analog differential serial input and sample the input to provide data and error signals, a first feedback loop responsive to the data and error signals to adjust the receiver portion, a second feedback loop separate from the first feedback loop and responsive to the phase of the differential serial input signal, and a clock data recovery block coupled to the second feedback loop to perform timing recovery.

Example 15 may include the receiver of example 14 wherein the receiver portion further includes a continuous time linear equalizer amplifier coupled to receive the differential serial analog input, and wherein the amplifier receives an automatic gain control coefficient via the first feedback loop. Example 16 may include the receiver of example 15 wherein the receiver portion further includes a decision feedback equalizer coupled to an output of the amplifier, wherein the decision feedback equalizer receives a decision feedback equalizer coefficient via the first feedback loop and provides data and error signals.

Example 17 may include the receiver of example 16 wherein the receiver portion further includes an unequalizer coupled to an output of the amplifier, wherein the unequalizer is a circuit identical to the decision feedback equalizer without receiving a decision feedback equalizer coefficient.

Example 18 may include the receiver of example 17 wherein both the decision feedback equalizer and the unequalizer include capacitive loads to integrate differential feedback currents and common mode currents respectively. Example 19 may include the receiver of example 16 wherein the receiver portion comprises an integrator and samplers separate from the decision feedback equalizer to provide unequalized data and error signals to the clock data recovery block.

Example 20 may include the receiver of example 19 wherein the first feedback loop includes a least mean squares error optimization block to receive the data and error signals from the decision feedback equalizer, and provides the automatic gain control coefficient and decision feedback equalizer coefficient.

Example 20 may include a serial I/O receiver including an receiver portion to receive an analog differential serial input and sample the input to provide data and error signals, an equalization feedback loop responsive to the data and error signals to adjust the receiver portion, a phase estimator responsive to the data and error signals to estimate a phase error, and a clock data recovery block coupled to the phase estimator to perform timing recovery for the receiver portion.

Example 22 may include the receiver of example 21 wherein the receiver portion further includes a decision feedback equalizer to receive a decision feedback equalizer coefficient via the equalization feedback loop and to receive a timing signal from the clock data recovery block.

Example 23 may include a system including a first device, a second device, and a serial I/O receiver coupled between the first device and the second device, the serial I/O receiver including an receiver portion to receive an analog differential serial input and sample the input to provide data and error signals, an equalization feedback loop responsive to the data and error signals to adjust the receiver portion, a phase feedback mechanism separate from the equalization feedback loop to provide a phase error, and a clock data recovery block coupled to receive the phase error to perform timing recovery for the receiver portion.

Example 24 may include the system of example 23 wherein the first device comprises a processor formed on a semiconductor chip.

Example 25 may include the system of example 23 or 24 wherein the second device comprises a graphics module supported by the semiconductor chip. Example 26 may include the system of example 23 or 24 wherein the second device comprises at least one of a chipset, add in card, and memory.

Example 27 may include the system of example 23 wherein the first device comprises at least one of a processor, a chipset, an add in card, a graphics module, and a memory, and wherein the second device comprises at least one of a processor, a chipset, an add in card, a graphics module, and a memory. Example 28 may include a method including receiving an analog differential serial input, sampling the differential serial input to provide data and error signals, providing equalization feedback to adjust the sampling, and performing timing recovery for the sampling independent of the equalization feedback to adjust the sampling.

Example 29 may include the method of example 28 wherein the timing recovery is performed as a function of a separate sampling of the differential serial input.

Example 30 may include the method of example 29 wherein the separate sampling provides unequalized data and error signals representative of the differential serial input. Example 31 may include the method of example 30 wherein the timing recovery is performed as a function of an estimation of the phase error independent of the equalization feedback to adjust the sampling.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An input/output receiver comprising:
   a receiver portion to receive an analog differential serial input and sample the analog differential serial input to provide data and error signals;
   an equalization feedback loop responsive to the data and error signals to adjust the receiver portion;
   a phase estimator responsive to the data and error signals to estimate an unequalized phase error, wherein the phase estimator is not subjected to the equalization feedback loop; and
   a clock data recovery circuit coupled to the phase estimator to perform timing recovery for the receiver portion.

2. The receiver of claim 1, wherein the receiver portion further comprises a decision feedback equalizer to receive a decision feedback equalizer coefficient via the equalization feedback loop and to receive a timing signal from the clock data recovery block.

3. The receiver of claim 1, wherein the receiver portion further comprises a continuous time linear equalizer amplifier coupled to receive the differential serial analog input.

4. The receiver of claim 3, wherein the continuous time linear amplifier receives an automatic gain control coefficient via the equalization feedback loop.

5. The receiver of claim 4, wherein the receiver portion further comprises a decision feedback equalizer coupled to an output of the continuous time linear equalizer amplifier, wherein the decision feedback equalizer receives a decision feedback equalizer coefficient via the equalization feedback loop and provides the data and error signals.

6. The receiver of claim 5 wherein the equalization feedback loop includes a least mean squares error optimization circuit to receive the data and error signals from the decision feedback equalizer, and provides the automatic gain control coefficient and the decision feedback equalizer coefficient.

7. The receiver of claim 6, wherein a separate integrator and samplers of a phase feedback mechanism are coupled to the output of the continuous time linear equalizer amplifier.

8. The receiver of claim 1, wherein the phase estimator comprises a digital estimator to provide a digital estimation of phase error to the clock data recovery circuit.

9. The receiver of claim 8, wherein the receiver portion further comprises a continuous time linear equalizer amplifier coupled to receive the differential serial analog input, wherein the time linear equalizer amplifier receives an automatic gain control coefficient via the equalization feedback loop.

10. The receiver of claim 9, wherein the receiver portion further comprises a decision feedback equalizer coupled to an output of the time linear equalizer amplifier, wherein the decision feedback equalizer receives a decision feedback equalizer coefficient via the feedback loop and provides data and error signals, and wherein the equalization feedback loop includes a least mean squares error block to receive the data and error signals from the decision feedback equalizer, and provides the automatic gain control coefficient and decision feedback equalizer coefficient.

11. A system comprising:
   a first device;
   a second device; and
   a serial input/output (I/O) receiver coupled between the first device and the second device, the serial I/O receiver comprising:
   a receiver portion to receive an analog differential serial input and sample the analog differential serial input to provide data and error signals;
   an equalization feedback loop responsive to the data and error signals to adjust the receiver portion;
   a phase feedback mechanism separate from the equalization feedback loop and not subjected to the equalization feedback, to provide an unequalized phase error; and
   a clock data recovery block coupled to receive the phase error to perform timing recovery for the receiver portion.

12. The system of claim 1, wherein the first device comprises a processor formed on a semiconductor chip.

13. The system of claim 11, wherein the second device comprises a graphics module supported by the semiconductor chip.

14. The system of claim 11, wherein the second device comprises at least one of a chipset, add in card, and memory.

15. The system of claim 11, wherein the first device comprises at least one of a processor, a chipset, an add-in card, a graphics module, and a memory, and wherein the second device comprises at least one of a processor, a chipset, an add-in card, a graphics module, and a memory.

* * * * *